(12) United States Patent
Napper

(10) Patent No.: US 8,363,948 B2
(45) Date of Patent: *Jan. 29, 2013

(54) CLASSIFICATION SCHEME AND SYSTEM FOR MODIFYING CHARACTER ALLOGRAPHS CONTAINED THEREIN

(75) Inventor: Jonathon Leigh Napper, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 0 days.

This patent is subject to a terminal disclaimer.

(21) Appl. No.: 13/214,222

(22) Filed: Aug. 21, 2011

(65) Prior Publication Data

US 2011/0299780 A1 Dec. 8, 2011

Related U.S. Application Data

(63) Continuation of application No. 13/005,524, filed on Jan. 12, 2011, now Pat. No. 8,019,160, which is a continuation of application No. 12/834,892, filed on Jul. 12, 2010, now Pat. No. 7,903,879, which is a continuation of application No. 12/324,646, filed on (Continued)

(30) Foreign Application Priority Data

Oct. 15, 2001 (AU) ..................... PR8244

(51) Int. Cl.
G06K 9/18 (2006.01)
(52) U.S. Cl. ......... 382/186; 382/100; 382/199; 345/179
(58) Field of Classification Search ............... 382/101, 382/186, 187, 189, 199, 204; 345/179, 180
See application file for complete search history.

(56) References Cited

U.S. PATENT DOCUMENTS

| | | | |
|---|---|---|---|
| 4,068,298 A * | 1/1978 | Dechant et al. | 1/1 |
| 4,491,960 A | 1/1985 | Brown | |
| 4,718,103 A | 1/1988 | Shojima et al. | |
| 4,864,618 A | 9/1989 | Wright et al. | |
| 5,005,205 A * | 4/1991 | Ellozy et al. | 382/187 |
| 5,051,736 A | 9/1991 | Bennett et al. | |
| 5,477,012 A | 12/1995 | Sekendur | |
| 5,526,281 A | 6/1996 | Chapman et al. | |
| 5,644,652 A * | 7/1997 | Bellegarda et al. | 382/186 |

(Continued)

FOREIGN PATENT DOCUMENTS

| | | | |
|---|---|---|---|
| EP | 0565871 A | 10/1993 | |
| GB | 2306669 A | 5/1997 | |

(Continued)

OTHER PUBLICATIONS

Dymetman, M., and Copperman, M., "Intelligent Paper in Electronic Publishing, Artist Imaging, and Digital Typography, Proceedings of EP '98", Mar./Apr. 1998, Springer Verlag LNCS 1375, pp. 392-406.

(Continued)

*Primary Examiner* — Vu Le
*Assistant Examiner* — Aklilu Woldemariam

(57) ABSTRACT

A system for modifying a classification scheme for classifying hand-written characters. The system includes a memory storing the classification scheme containing a plurality of user dependent allographs, each allograph representing a respective style of a respective letter; and a processor configured for: receiving data representing a handwritten character; selecting an allograph representing the handwritten character; modifying the allograph in accordance with the selection; and storing a modified classification scheme which includes the modified allograph.

6 Claims, 2 Drawing Sheets

Related U.S. Application Data

Nov. 26, 2008, now Pat. No. 7,760,947, which is a continuation of application No. 10/492,152, filed as application No. PCT/AU02/01394 on Oct. 15, 2002, now Pat. No. 7,469,062.

U.S. PATENT DOCUMENTS

| | | | |
|---|---|---|---|
| 5,652,412 A | | 7/1997 | Lazzouni et al. |
| 5,661,506 A | | 8/1997 | Lazzouni et al. |
| 5,675,665 A | * | 10/1997 | Lyon ............................ 382/229 |
| 5,692,073 A | | 11/1997 | Cass |
| 5,852,434 A | | 12/1998 | Sekendur |
| 5,917,924 A | | 6/1999 | Herbert |
| 5,953,692 A | * | 9/1999 | Siegel .............................. 704/1 |
| 6,018,591 A | * | 1/2000 | Hull et al. ..................... 382/186 |
| 6,038,343 A | | 3/2000 | Shimizu et al. |
| 6,076,734 A | | 6/2000 | Dougherty et al. |
| 6,108,444 A | * | 8/2000 | Syeda-Mahmood ......... 382/186 |
| 6,236,740 B1 | * | 5/2001 | Lee ................ 382/119 |
| 6,256,410 B1 | | 7/2001 | Nathan et al. |
| 6,556,712 B1 | * | 4/2003 | Loudon et al. ................ 382/187 |
| 6,964,374 B1 | | 11/2005 | Djuknic et al. |
| 7,272,259 B2 | * | 9/2007 | Houle et al. .................. 382/187 |
| 7,362,901 B2 | | 4/2008 | Walch |
| 7,545,959 B2 | * | 6/2009 | Houle et al. .................. 382/115 |
| 2005/0018906 A1 | * | 1/2005 | Napper ........................ 382/186 |
| 2007/0140561 A1 | * | 6/2007 | Abdulkader et al. ......... 382/187 |

FOREIGN PATENT DOCUMENTS

| | | |
|---|---|---|
| JP | 07-200742 | 8/1995 |
| JP | 09-035006 | 2/1997 |
| JP | 11-219433 | 4/1999 |
| WO | WO 99/18487 A2 | 4/1999 |

OTHER PUBLICATIONS

Prevost et al "Non-supervised Determination of Allograph Subclasses for On-Line Omni-scriptor Handwriting Recognition" Fifth International Conference on Document Analysis and Recognition, Sep. 20-22, 1999 (Whole document).

Vuurpijl et al. "Finding structure in diversity. A hierarchial clustering method for the categorization of allographs in handwriting" Fourth International Conference on Document Analysis and Recognition Aug. 18-20, 1997 (Whole document).

* cited by examiner

CLASSIFICATION SCHEME AND SYSTEM FOR MODIFYING CHARACTER ALLOGRAPHS CONTAINED THEREIN

CROSS REFERENCES TO RELATED APPLICATIONS

The present application is a Continuation of U.S. application Ser. No. 13/005,524 filed Jan. 12, 2011, now issued with U.S. Pat. No. 8,019,160, which is a Continuation of U.S. application Ser. No. 12/834,892 filed on Jul. 12, 2010, now issued U.S. Pat. No. 7,903,879, which is a Continuation of U.S. application Ser. No. 12/324,646 Nov. 26, 2008, now issued U.S. Pat. No. 7,760,947, which is a Continuation of U.S. application Ser. No. 10/492,152 filed on Apr. 9, 2004, now issued U.S. Pat. No. 7,469,062, which is a 371 of PCT/AU02/01394 filed on Oct. 15, 2002, the entire contents of which are incorporated by reference.

TECHNICAL FIELD

The present invention relates to a method and apparatus for modifying a classification scheme. In particular, the modification is adapted to allow a user independent classification scheme to be modified into a user dependent classification scheme.

BACKGROUND ART

The reference to any prior art in this specification is not, and should not be taken as, an acknowledgment or any form of suggestion that the prior art forms part of the common general knowledge.

Handwriting recognition systems are generally classed as writer-dependent, meaning they have been trained to recognise the specific writing style of a single user, or writer-independent, meaning they have been trained to recognise the writing of any user. Writer-dependent systems are usually able to produce more accurate recognition (for a specific user) than writer-independent systems, since they need only model the style of a single writer. However, they generally require the user to enter a large amount of training information to allow the user-specific training to take place. Conversely, writer-independent systems do not require user-specific training as they are generally developed using a corpus of training data from a large number of users. Since these systems must cater for a wide range of stylistic variation in stroke and letter formation, they are more likely to encounter confusion between character classes.

Writer adaptation is the process of transforming a writer-independent recognition system into a writer-dependent system using data provided by the user. Adaptive systems are attractive since they do not require the user to perform the lengthy process of entering training data, and can, over time, approach the recognition accuracy of a writer-dependent system. In addition to this, they are able to adapt to the changing writing style of a user over time.

One of the difficulties in developing an adaptive system is to ensure that the adaptations that occur lead to improved recognition. If not carefully implemented, adaptive procedures can decrease the overall recognition rate for a specific user, for example, by the inclusion of an incorrectly labelled prototype, or adaptation using a badly formed or ambiguous pattern. As a result, many adaptive systems require guidance from the writer to perform adaptation, using interaction with the user to ensure the data used for adaptation is well-formed and correctly labelled. Examples of this are described in U.S. Pat. No. 5,917,924, U.S. Pat. No. 5,754,686, U.S. Pat. No. 5,544,260, and U.S. Pat. No. 5,550,930.

While this can reduce the occurrence of degenerative adaptation, it requires the user to be involved with performing a number of possibly lengthy and tedious operations.

Adaptive classifiers must use some kind of learning process to allow the system to adapt to a user's specific style. Supervised learning is the process whereby the behaviour of a classifier is modified based on the correct labelling of a set of samples (ie. the correct category of each example is supplied). However, this information is generally not available to an adaptive system without user intervention, since the only labelling information available is the output of the classifier itself. Alternatively, unsupervised learning techniques (also known as self-organised learning) do not require labelled samples for the learning processes, and thus are suited to adaptive systems where the correct result is not known.

Competitive learning is an unsupervised learning process that requires elements of a system to compete with each other for activation, and is described for example in C. von der Malsburg, "Self-Organisation of Orientation Sensitive Cells in the Striate Cortex". *Kybernetik,* 14:85-100, 1973, for the self-organisation of orientation-sensitive nerve cells. Similarly, it is also described in K. Fukushima, "Cognitron: a Self-Organising Multilayered Neural Network". *Biological Cybernetics,* 20:121-136, 1975 for the self-organisation of a multi-layer neural network called the cognitron. There are also neurobiological justifications for competitive learning techniques as described in J. Ambros-Ingerson, R. Granger, and G. Lynch, "Simulation of Paleocortex Performs Hierarchical Clustering". *Science,* 247: 1344-1348, 1990.

Further examples of documents describing these techniques will now be described.

V. Vuori, J. Laaksonen, E. Oja and J. Kangas, "On-line Adaptation In Recognition of Handwritten Alphanumeric Characters", *Proceedings of the Fifth International Conference on Document Analysis and Recognition. ICDAR '99.* IEEE Computer Society, Los Alamitos, Calif., USA describe a user-specific adaptive system for handwritten alphanumeric characters that includes various combinations of three strategies. These include adding prototypes based on a k-NN search, inactivating prototypes which appear more harmful than useful, and prototype reshaping, based on Learning Vector Quantisation, as described in T. Kohonen, "Self Organising Maps", *Volume* 30 *of Springer Series in Information Sciences.* Springer-Verlag, 1997.

The classifier is based on the simple Condensed Nearest-Neighbour rule, with a semi-automatic prototype-clustering algorithm used during training to condense the prototypes. Dynamic Time-Warping using various point-to-point, point-to-line, and area metrics is used to calculate the similarity measure between input and prototypes. The approach to prototype deactivation uses supervised learning ("user-reported misclassifications are used to revise the system", as described in J. Laaksonen, V. Vuori, E. Oja and J. Kangas, "Adaptation of Prototype Sets In On-line Recognition Of Isolated Handwritten Latin Characters"). The system also makes decisions driven by inter-class confusion rather than specific class-based allograph identification. The approach is also based on a binary decision, with the confusing prototypes "removed from the set of active prototypes".

L. Schomaker, H. Teulings, E. Helsper, and G. Abbink, "Adaptive Recognition Of Online, Cursive Handwriting", *Proceedings of the Sixth International Conference on Handwriting and Drawing.* Paris, Jul. 4-7, 1993: Telecom, (pp. 19-21) and L. Schomaker, H. Teulings, G. Abbink, and E. Helsper "Adaptive Recognition of On-line Connected-cursive Script for use in Pen-based Notebook Computers." Handout, distributed with demonstrations presented at the IWFHR III, CEDAR, SUNY Buffalo, USA, May 25-27, 1993 describe a cursive script recognition system based on prototypical strokes clustered using a Kohonen Self Organising Map (SOM). The processes described use a writer-independent stroke-transition network that is used to recognise the written input.

If any of the top twenty possible words output by the recogniser are found to be a valid word as defined by a dictionary, the values in the stroke-transition network are "incremented in small steps until either the target word is at the top of the output list of words, or until a maximum number of iterations is reached." The adapted system contains user-specific probabilities for individual stroke interpretations in the stroke-transition network.

L. Heutte, T. Paquet, A. Nosary and C. Hernoux, "Defining Writer's Invariants To Adapt the Recognition Task", *Proceedings of the Fifth International Conference on Document Analysis and Recognition*, IEEE Computer Society, 1998 uses morphological writer-specific invariants to improve the recognition of an Offline Character Recognition (OCR) system. The technique requires the detection and clustering of writer-specific invariants, which are used in combination with contextual knowledge, to disambiguate the recognition process.

A number of approaches have been proposed that use adaptive techniques for the training of classifiers such as S. Connell and A. Jain, "Learning Prototypes For On-Line Handwritten Digits", *Proceedings of the 14th International Conference on Pattern Recognition*, Brisbane, Australia, pp. 182-184, August 1998, and G. Hinton, C. Williams, and M. Revow, "Adaptive elastic models for character recognition", *Advances in Neural Information Processing Systems* 4, Morgan Kaufmann, San Mateo, Calif.

Similarly S. Connell and A. K. Jain, "Writer Adaptation of Online Handwritten Models," *Proc. 5th International Conference on Document Analysis and Recognition*, Bangalore, India, pp. 434-437, September 1999 describes a system of writer adaptation that attempts to construct a user-specific writing style based on the identification of lexemes within a writer-independent model, and then uses this writer-dependent model to retrain their classifier. Since the approach is based around the training of a Hidden Markov Model (HMM) classifier, the adaptation technique is presumably performed once only for each writer (due to the large overhead required to retrain an HMM system). None of these techniques attempt to perform continuous user-specific adaptation based on user input.

U.S. Pat. No. 6,038,343, describes an approach to adaptation that uses the generation of writer-specific feature vectors in combination with a user-independent "universal recognition dictionary" to improve recognition results. They employ statistical regression to "predict a writer-specific feature vector for each of multiple alternative categories from the feature vector of an input character". This method "corrects" the user-independent feature vectors by combining them with the writer-specific feature vectors, which are then used generatively to create character predictions for future user input vectors.

U.S. Pat. No. 5,917,924 uses adaptive weights that modify the likelihood of prototypes being matched as candidates in the recognition process and "only varies the weighting values in editing mode". That is, the method only makes changes to the prototype weights based on results determined from user interaction.

U.S. Pat. No. 5,754,686 describes an approach to using a user-specific dictionary to store writer-dependent models. "If recognition reliability is low, a warning is issued. In response to a warning, the user or operator can decide whether the character pattern should be registered in the user dictionary." The pattern is automatically assessed for suitability for inclusion in the user dictionary (presumably using a metric of ambiguity with existing prototypes) but no claim is made as to how the user-specific dictionary prototypes are combined with the existing writer-independent models during recognition.

U.S. Pat. No. 6,256,410 describes a standard scheme for training a writer-dependent HMM classifier, whereby user-specific training data is segmented using writer-independent models, and a set of character-based models are iteratively trained using the training data.

U.S. Pat. No. 5,319,721 describes a method for evolving a set of user-independent prototypes into a writer-dependent set. If the input stroke data matches a prototype to within a certain threshold, the user data is merged with the existing prototype to produce a writer-dependent prototype and "one or more starter prototype symbols of the same label as the input symbol" are deleted. If the stroke data does not match the existing prototypes, a new prototype is created, and again, one or more starter prototypes of the same label are deleted.

In U.S. Pat. No. 5,544,260 it is described that using "information provided during error correction for modifying character prototypes," that is, using correction strokes made by the user to update mis-recognised prototypes. Similarly, U.S. Pat. No. 5,550,930 describes a method of storing recognition results, and, when requested by a user, displaying the results and allowing the user to select the input and corresponding symbols for classifier training.

U.S. Pat. No. 5,285,505 describes a method for "creating character prototypes for improving recognition accuracy of similarly shaped characters" by emphasising the sections of the character that are critical for discrimination and de-emphasising sections that are similar between characters. This approach is targeted specifically in resolving two-class ambiguities, such as 'g'/'y' and 'A'/'H' confusion.

DISCLOSURE OF THE INVENTION

In a first broad form the present invention provides a method of modifying a classification scheme for classifying hand-written characters to thereby make the classification scheme user dependent, the classification scheme including a number of allographs, each allograph representing a respective style of a respective letter, the method including:
 a) Obtaining at least one hand-written character;
 b) Selecting an allograph representing the character; and,
 c) Modifying one or more of the allographs in accordance with the selection.

Typically, the method includes modifying the allographs to reflect that the selected allograph corresponds to a style of the respective letter used by the user.

The classification scheme can include a number of classes, each class representing a respective letter and containing one or more of the allographs, the method including:
 a) Selecting a class representing the character to thereby determine the letter represented by the character; and,
 b) Modifying one or more of the allographs in the respective class.

Each allograph typically contains one or more prototypes, each prototype representing a variation in the respective allograph, the method including:

a) For at least some of the prototypes, determining a selection value based on the similarity of the character and a respective prototype; and,
b) Selecting a respective one of the prototypes in accordance with the determined selection values.

The method generally includes selecting the class in accordance with the selected prototype.

The method usually includes selecting the allograph in accordance with the selected prototype.

Each prototype is typically represented as a prototype vector, each prototype vector being formed from a number of values, each value quantifying a respective feature of the respective prototype. In this case, the method of determining a selection value typically includes:
a) Determining a feature vector representing the character, the feature vector being formed from a number of values, each value quantifying a respective feature of the character; and,
b) Determining a distance value representing the distance between the feature vector and the respective prototype vector.

Each allograph preferably includes an associated weighting, in which case the method typically includes:
a) Selecting the allograph in accordance with the weightings; and,
b) Modifying the allographs by modifying the weighting of one or more of the allographs.

Alternatively, the method can involve simply removing the allographs that are not used by the user, although it will be appreciated that this is generally less accurate.

The selection value is typically determined in accordance with the determined distance value and the weighting associated with the respective allograph.

The method typically includes modifying the weighting of at least the allograph containing the selected prototype.

The method usually includes selecting the prototype having the lowest selection value.

The method of modifying the weightings can include at least one of:
a) Decreasing the weighting for the allograph containing the selected prototype; and,
b) Increasing the weighting for one or more of the allographs that do not contain the selected prototype.

The method generally includes increasing and/or decreasing the weighting of the allographs by a predetermined amount.

Alternatively the method can include:
a) Selecting a reference prototype for each allograph to be modified;
b) Determining the distance value for each reference prototype;
c) Determining an average of the determined distance values; and,
d) Modifying the weighting of each allograph in accordance with the distance value of the respective reference prototype and the average distance value.

In this case, the reference prototype is usually the prototype having the lowest distance value for the respective allograph.

The method is typically performed using a processing system, the processing system including:
a) A store for storing allograph data representing the allographs;
b) A processor, the processor being adapted to:
i) Obtain the hand-written character;
ii) Select the allograph; and,
iii) Modify the one or more allographs.

In a second broad form the present invention provides apparatus for modifying a classification scheme for classifying hand-written characters to thereby make the classification scheme user dependent, the apparatus including:
a) A store for storing allograph data representing a number of allographs, each allograph representing a respective style of a respective letter; and,
b) A processor, the processor being adapted to:
i) Obtain at least one hand-written character;
ii) Select an allograph representing the character; and,
iii) Modify the allograph data, thereby modifying one or more of the allographs in accordance with the selection.

In this case, the allograph data typically includes a weighting associated with each allograph, the processor being adapted to modify the allograph data by modifying the weightings.

The store can also be adapted to store class data, the class data representing a number of classes, each class representing a respective letter and containing one or more of the allographs.

The store may be adapted to store prototype data representing prototypes, each allograph containing one or more prototypes, each prototype representing a variation in the respective allograph.

The processor is preferably adapted to perform the method of the first broad form of the invention.

In a third broad form the present invention provides a method of classifying hand-written characters using a user dependent classification scheme, the classification scheme including a number of allographs, each allograph representing a respective style of a respective letter and having a respective weighting representing the user dependency, each allograph containing one or more prototypes, each prototype representing a variation in the respective allograph, the method including:
a) Obtaining at least one hand-written character;
b) For at least some of the prototypes, determining a selection value based on the similarity of the character and a respective prototype, and the weighting of the allograph containing the respective prototype;
c) Selecting a respective one of the prototypes in accordance with the determined selection values; and,
d) Classifying the character in accordance with the selected prototype.

Each prototype can be represented as a prototype vector, each prototype vector being formed from a number of values, each value quantifying a respective feature of the respective prototype.

In this case, the method of determining a selection value typically includes:
a) Determining a feature vector representing the character, the feature vector being formed from a number of values, each value quantifying a respective feature of the character;
b) Determining a distance value representing the distance between the feature vector and the respective prototype vector; and,
c) Determining the selection value in accordance with the determined distance value and the weighting associated with the respective allograph.

The classification scheme can include a number of classes, each class representing a respective letter and containing one or more of the allographs. In this case, the method usually includes selecting a class in accordance with the selected prototype to thereby determine the letter represented by the character.

In general the classification scheme is modified in accordance with the method of the first broad form of the invention.

The method generally includes using a processing system, the processing system including:
a) A store for storing:
   i) Allograph data representing the allographs and the associated weightings; and,
   ii) Prototype data representing the prototypes; and,
b) A processor, the processor being adapted to:
   i) Obtain the hand-written character;
   ii) Determine the selection values;
   iii) Select the prototype; and,
   iv) Classify the character.

In a fourth broad form the present invention provides apparatus for classifying hand-written characters using a user dependent classification scheme, the apparatus including:
a) A store for storing:
   i) Allograph data representing a number of allographs, each allograph representing a respective style of a respective letter, and a weighting associated with each allograph, the weighting representing the user dependency of the allograph; and,
   ii) Prototype data representing one or more prototypes, each prototype representing a variation in the respective allograph; and,
b) A processor, the processor being adapted to:
   i) Obtaining at least one hand-written character;
   ii) For at least some of the prototypes, determine a selection value based on the similarity of the character and a respective prototype, and the weighting of the allograph containing the respective prototype;
   iii) Select a respective one of the prototypes in accordance with the determined selection values; and,
   iv) Classify the character in accordance with the selected prototype.

In this case, the store can be adapted to store class data representing a number of classes, each class representing a respective letter and containing one or more of the allographs.

The processor can therefore be adapted to perform the method of the third broad form of the invention.

BRIEF DESCRIPTION OF FIGURES

The present invention should become apparent from the following description, which is given by way of example only, of a preferred but non-limiting embodiment thereof, described in connection with the accompanying figure, wherein.

MODES FOR CARRYING OUT THE INVENTION

The following modes are described as applied to the written description and appended claims in order to provide a more precise understanding of the subject matter of the present invention.

Figure 1:
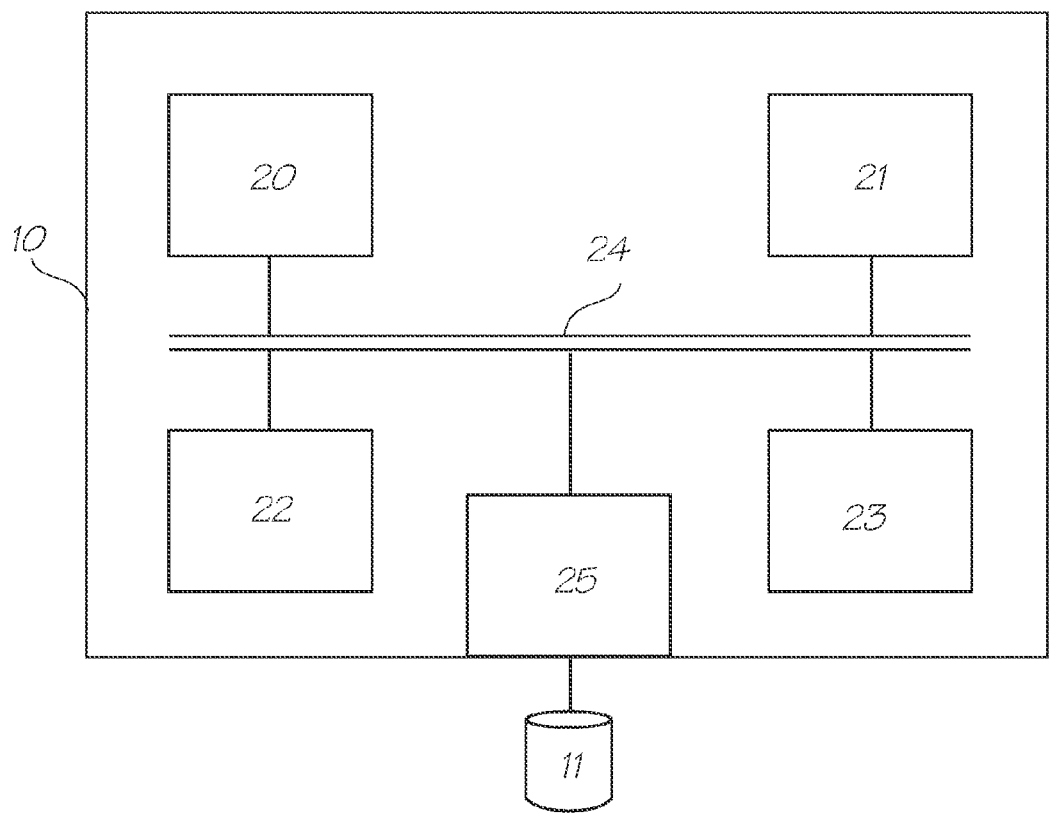
FIG. 1 is an example of a processing system suitable for performing the present invention.

An example of apparatus suitable for implementing the present invention will now be described with reference to FIG. 1, which shows a processing system 10 adapted to perform handwriting recognition.

In particular, the processing system 10 generally includes at least a processor 20, a memory 21, and an input device 22, such as a graphics tablet and/or keyboard, an output device 23, such as a display, coupled together via a bus 24 as shown. An external interface is also provided as shown at 25, for coupling the processing system to a store 11, such as a database.

In use, the processing system is adapted to receive and decode handwritten text characters using a predetermined classification scheme. Initially the classification scheme is user independent, however, the processing system 10 is also adapted to modify the scheme, thereby making the scheme user dependent, to thereby increase the accuracy of the character recognition.

From this, it will be appreciated that the processing system 10 may be any form of processing system such as a computer, a laptop, server, specialised hardware, or the like, which is typically adapted to perform these techniques by executing appropriate applications software stored in the memory 21.

In order to achieve this, the processing system 10 implements a classification scheme that utilises allographs for identifying respective styles of letter. The processing system then uses adaptive learning of the letter allographs used by a specific writer.

Figure 2:
FIG. 2 is an example of two static allographs of the letter "a"

Letter allographs model the stylistic variation in the writing of individual character classes. That is, they represent the different ways that a character may be drawn. Allographs can be defined as static, meaning that the overall shape of the characters discriminates one allograph from another. Examples of static allographs of the letter "a" are shown in FIG. 2.

Figure 3:
FIG. 3 is an example of two dynamic allographs of the letter "a"

Allographs can also be dynamic, where the allographs may look similar but are differentiated by dynamic stroke information (ie. the order or direction of strokes that make up the letter). Examples of dynamic allographs of the letter "a" are shown in FIG. 3. In particular, in this example the basic shape of the two letters is similar, but the version 1 has been drawn with a single stroke, while the version 2 second has been drawn with two strokes. Since allographs can have both a dynamic and static meaning, it is possible for allograph-based adaptation to work in both online and offline (ie. Optical Character Recognition) systems.

A writer-independent system must model all the possible allographs that it may encounter. However, users generally use a single allograph for each letter when writing. Thus, a particular user will generally write a given letter in the same style each time.

As a result, a writer-independent system will contain a large number of allographs that are not required for recognition for a particular user. These superfluous allographs can lower the recognition accuracy of a system since they may be similar to an allograph of a different class that the writer does use.

Figure 4:
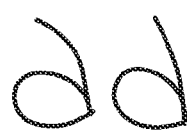
FIG. 4 is an example of two similar allographs of the letter "a" and the letter "d"

An example of this is shown in FIG. 4. In particular, the allograph on the left represents the letter 'a', while the allograph on the right represents the letter 'd'. Clearly, there is a great deal of similarity between these two allographs, with the obvious possibility of incorrect recognition.

The letter 'a' allograph shown here is rarely used in handwriting, and is not needed for the recognition of most writing styles. Writer-independent systems need to support this allograph however because a small number of writers use this style, but by allowing this allograph, the potential for the incorrect recognition of letters is increased.

Thus, it will be appreciated that a particular individual will not generally write the letters "a" and "d" in such a similar fashion, and accordingly, it is unlikely that both the allographs shown in FIG. 4 would be required in a user dependent classification system.

Thus, the processing system is adapted to learn which allographs a writer uses, allowing other allographs for the same letter to be ignored, thereby improving the character recognition for a respective writer. This therefore allows the processing system to be able to support a wide range of writing styles with higher recognition accuracy.

In use, the processing system 10 therefore operates to receive a character, and compares the character to letters, and allographs stored in the database 11. This allows the processor to determine the letter and allograph to which the character corresponds.

This is generally achieved by comparing the character to prototypes stored in the database 11. The prototypes are grouped into respective allographs and letters. Accordingly, the similarity between the character and the prototypes is used to select the prototype that most closely matches the character, thereby allowing the character to be assigned to a respective letter and allograph group.

In particular, this is usually achieved by defining the character in terms of a feature vector. In this case, the feature vector includes values representing different features of the letter. The prototypes are stored as prototype vectors, allowing the distance between the feature vector and prototype vectors to be measured in a feature space, thereby allowing the most similar prototype to be determined.

The processor then modifies the allographs corresponding to the selected letter, thereby indicating that the allograph is an allograph used by the respective user. This is generally achieved by having a weighting associated with each allograph, with the processor being adapted to modify the weightings of the allographs. Thus for example, the weighting of the allograph used by the user can be increased/decreased, with the weightings of the other allographs being decreased/increased accordingly.

These techniques will now be described in more detail.

In particular, the following is a description of a competitive learning algorithm for handwritten character allographs. In this example, the technique will be described in terms of a simple template-matching classifier (specifically, a Euclidean-distance nearest-neighbour classifier). However, persons skilled in the art will appreciate that the procedure can be applied to any classifier type that can support the partitioning of classes into subclasses, and the subsequent weighting of those subclasses.

In addition to this, the weight updating procedure is not metric dependent and simply relies on some numeric indication of prototype similarity. Thus, the technique can be used with distance metrics such as Euclidean-distance, Dynamic Time-Warping, etc.

In the initial stages, the processor 20 will receive an input signal representing the character under consideration. This is usually received from the input device 22, but may also be retrieved from characters stored in the database. In any event, the processor 20 performs pattern classification by mapping the input signal, which may be pre-processed to perform some kind of normalisation, into a multi-dimensional feature space. The processor therefore assigns values to quantify respective predetermined features of the letter, such as letter height, width, number of strokes, maximum stroke length, or the like. The mapping is used to generate a feature vector.

The processor 20 then applies the feature vector to a set of class models to determine which class is most likely to have generated the given features.

Template-matching classifiers work by storing prototypical examples of classes (prototypes), and perform classification by using some similarity metric to compare the input features with the prototypes. The class of the prototype that is most similar to the input feature vector is assumed to be the class of the input pattern. As an example, a simple Euclidean-distance nearest-neighbour classifier simply stores the feature vectors of a set of training examples, and labels an input pattern with the class of the training pattern feature vector that has the minimum Euclidean-distance from the input feature vector.

For writer-dependent allograph training to occur, the writer-independent classifier must contain allograph information for each prototype. This means that each training example must be labelled by both class and allograph. To label allographs, a number of semi-automatic procedures exist. For example, L. Vuurpijl and L. Schomaker. "Finding Structure In Diversity: A Hierachical Clustering Method For the Categorization of Allographs In Handwriting," in ICDAR, pages 387-393. IEEE, August 1997 describes an agglomerative hierarchical clustering method that assists the selection and labelling of allographs for individual letter classes.

Figure 5:
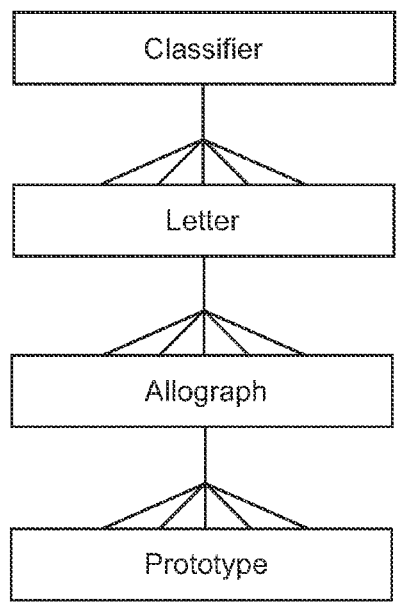
FIG. 5 is a schematic diagram of an example of the structure of a classification system; and, FIG. 6 is a schematic diagram of an example of modifying the allograph weight on the classifier decision regions.

In general the structure of the classification scheme will be as shown in FIG. 5. Thus, a single classifier will generally contain many letters. In this regard, it will be appreciated that the term letters will include any alphanumeric character, punctuation, or ideogram. Each letter includes one or more allographs, with each allograph representing a different letter style. Each allograph will then include one or more prototypes, each of which represents variations in the respective allograph. Thus, for example, the prototypes will be used to account for variations in size, shear, angle and the like.

Thus, it is possible for many prototypes of the same class to be identified as the same allograph—allographs model a specific writing style for a particular letter, whereas individual prototypes represent instances of that writing style. For example, in a nearest-neighbour classifier, it is common to have many prototypes representing the same class, with the differences between the prototypes modelling the possible in-class variations of the features (such as translation, rotation, shearing, etc.) Similarly, many prototypes of the same allograph may model the variations in writing of that allograph. Thus a classifier supports many letter classes, a class supports many allographs, and an allograph may support many prototypes.

In this procedure, classification proceeds by calculating the distance between each prototype vector and the input feature vector in the feature space. This distance represents the similarity between the feature vector and the prototype vector, and hence the similarity between the character and a respective prototype. The processor 20 then determines the class of the prototype in accordance with the minimum distance as the label of the input data. Thus, the processor 20 determines the prototype vector separated from the feature vector by the minimum distance value and uses this to determine the letter represented by the character.

In order to support the writer-specific determination of allographs, the distance value for each prototype is multiplied by a weighting factor depending on its allograph type. Thus allographs with higher weights are less likely to be matched, since the higher weighting will increase the distance metric, so decreasing a weight increases the probability that an allograph will be matched; increasing the weight decreases the probability of a match.

Initially all weights for all allographs are initialised to the same non-zero value (for example, 1), indicating that no writer-specific preference is given to an allograph. At this point the classification scheme is independent.

Adding in the weighting, the distance value is calculated for a Euclidean-distance nearest-neighbour classifier as follows:

$$\delta(x) = \operatorname*{argmin}_{i=1}^{n}(D_i(x))$$

$$D_i(x) = w_i \times \|x - y_i\|$$

Where:
$y_i$ is the feature vector of prototype i;
$w_i$ is the (shared) allograph weight of prototype i.
$p_i \in (\mathfrak{R}^d, \Omega)$,
x is the input feature vector such that $x \in \mathfrak{R}^d$,
$\delta(x)$ is the classifier decision function such that $\delta(x): \mathfrak{R}^d \to \Omega$ is:
$\Omega$ are the classes such that $\Omega = \{\omega_1, \ldots, \omega_n\}$
$\{p_1, \ldots, p_m\}$ are the prototypes The weightings are determined to reflect the allographs that the user uses. Thus the processor 20 operates to perform weight adaptation to modifying the allograph weights to give preference to allographs that the writer is more likely to use.

Thus, the selection of a prototype as the best match for the input signal is an indication that the writer uses the allograph of the prototype. Accordingly, in a simple approach the processor 20 performs weight adaptation by reducing the weight of the allograph containing the selected matching prototype by a small amount η (the learning-rate). Similarly, the processor 20 increases the weights of the remaining allographs in the respective class by a similar amount. Allograph weights in the unmatched classes are not modified.

Thus, for each allograph i in the matching class:

$$w_i = w_i - \eta \quad \text{if } i = c$$
$$= w_i + \eta \quad \text{otherwise}$$

where:
c is the allograph number of the matching prototype, and
η is the learning rate parameter.

It will be appreciated that the classifier will not always match the correct class.

As an example, a badly formed 'a' might match the letter 'd', resulting in an update that decreases the weight of an allograph of 'd' that the writer may not use. However, subsequent correct matches of the 'd' allograph used by the writer will increase the unused allograph weight and decrease the correct allograph weight.

It follows that weight adaptation should occur slowly, to avoid inaccurate classifications giving too much weight to an incorrect allograph. However, the higher the learning rate, the more quickly that adaptation will take place, resulting in higher recognition accuracy. It is therefore necessary to find a balance for the magnitude of the learning rate.

It will be appreciated that this may be implemented by having the magnitude of the learning rate adjustable by the user. Thus, the learning parameter η, which is typically stored in the database 11, can be adjusted by the user, to allow the rate of learning to be adjusted. This allows the user to set a desired level of learning, which can then be reduced if too many inaccuracies occur.

It is also desirable to ensure that the weights do not get too large or too small. If an allograph weight is too small, the decision boundary for that allograph (and thus the class) may encroach on surrounding classes, causing incorrect class decisions to be made by the classifier. Thus, if the weighting increases by too much, it is unlikely that the feature vector will ever be matched to one of the prototypes contained therein. In this instance, this can result in entire allographs being excluded from the matching procedure, even though there is a chance that these could on occasions be used.

Accordingly, upper and lower thresholds are generally provided for the weightings, with the weighting being held at the threshold if the modification would push the weighting above the upper threshold, or below the lower threshold. Again, provision may be made to allow the user to adjust the thresholds if so desired.

Ensuring the weight does not get too large allows allographs to increase in priority if the user changes their writing style at a later date.

Figure 6:
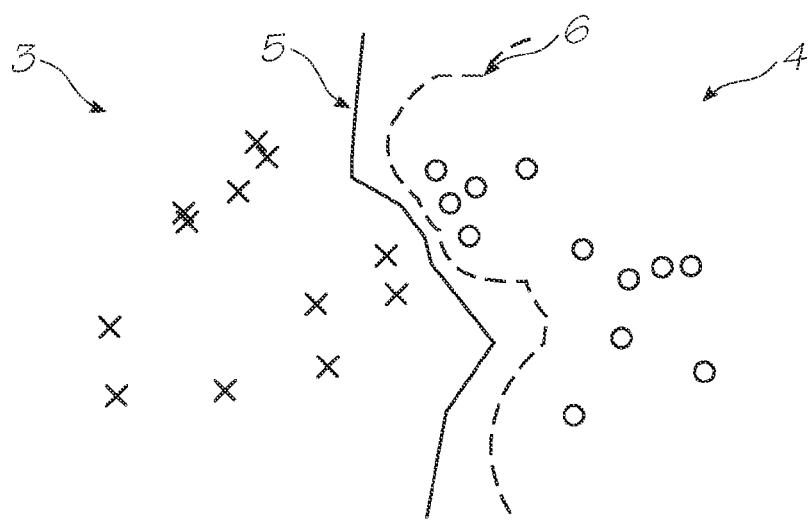

The effect of modifying the allograph weight on the classifier decision regions is shown in FIG. 6. In particular, in this example, as the weight for the class 3 is decreased, this pushes the original decision boundary 5 (solid line) toward the class 4 forming a new decision boundary 6 (dashed line) that gives a higher probability of matching class 3 over class 4.

The simple weight adaptation procedure described above can suffer from a number of problems.

In particular, a number of allographs might match almost equally (ie. there is only a very small difference between the distances to two different allographs from the feature vector) indicating there is no strong evidence of one allograph being usage in preference to the other. Conversely, there may be a large difference between the allograph scores, indicating a clear preference for one allograph type over another.

In the first situation, the weight updating should be small, reflecting the lack of confidence in the identification of the correct allograph. In contrast, in the second situation the weight updating should be large to ensure unused allographs are quickly identified and de-prioritised.

Thus, the weight updating should compare the minimum distances of the allograph groups (ie. the distances of the best matching prototype for each allograph) and update the weights proportionally to these values. In this way, the allographs are made to compete with one another, since the distance results of each allograph have an impact on the weight modification made to the remaining allographs.

To implement this kind of weight updating, the processor 20 first determines the class containing the character. This is performed as described above by having the processor 20 locate the prototype that most closely resembles the character. Once this has been performed, the processor 20 operates to determine a minimum distance for each allograph group in the class. This is achieved by determining the distance between the feature vector and the closest prototype vector for each allograph group.

The processor 20 then determines the mean of the minimum distances for the allographs in the class, and uses this to update each weighting. In particular, the weighting modification for a particular allograph is based on the difference between the allograph's minimum distance and the mean distance. To ensure that very large distances do not produce very large changes to the mean, all distances are converted to an exponential form, as follows.

for each allograph i within the matched class $$M_i = \underset{j}{\operatorname{argmin}}(D_j)$$

$$E_i = e^{-M_i}$$

$$\overline{E} = \frac{\sum_i^n E_i}{n}$$

$$w_i = w_i + \eta \times (\overline{E} - E_i)$$

where: η is the learning rate parameter.

Using this procedure, allographs with minimum distances below the mean distance will have larger values of $E_i$ (since $e^0=1$ and $\lim e^{-x} \to 0$ as $x \to \infty$) resulting in negative updates to the allograph weight since the mean will be less than $E_i$. The greater $E_i$ is above the mean distance, the greater the weight update.

Thus, poorly matched allographs will be updated with positive weight increment depending on how small $E_i$ is compared to the mean. Further, ambiguous results (where minimum allograph distances do not differ significantly) will produce very small weight updates, since all distances will not lie far from the mean.

The procedure described above is automatic and therefore requires not intervention from the user. In particular, the process is unsupervised as there is no feedback from the user or another source to teach the correct identification of characters in the event that incorrect determinations are made.

However, it is possible to support some supervision in the weight adaptation process if additional information about the classification of the input signal is available (for example, contextual-language models). In this situation, weight updating can be delayed until all recognition processing has been performed, when the final results can be used to modify or verify the raw similarity metrics of the classifier.

For example, weight updating might only be performed if the classifier decision matches the final decision produced by the recogniser. Thus, if the classifier selects the letter 'd' as the most likely match, but later processing concludes that the letter is really an 'a', the weight update would not take place.

Alternatively, most recognition systems generate some kind of confidence level for letter alternatives, and this probability can be incorporated into the weight update procedure so that updates occur proportionally to the level of confidence that the letter is correctly and unambiguously identified.

Furthermore, user feed back could be provided, such that if the processor 20 determines the wrong letter, the user can supply an indication of the correct letter, allowing the processor 20 to adjust the weightings of the allographs accordingly.

Accordingly, the above-described process provides a procedure for the competitive learning of letter allographs. This adaptive learning process is able to improve the accuracy of a handwritten character recognition system by minimising the recognition probability of letter allographs that are not used by a specific writer. A number of weight adaptation mechanisms are described.

It will be appreciated that in the hardware implementation described above, the weightings are stored in the database 11. Accordingly, it is possible to store the weightings in accordance with a user identifier. This allows different sets of weightings to be stored associated with different users. In turn, this allows the processing system 10 to be used to classify handwriting for a number of different users. In this case, each time handwriting from a different user is analysed, the identifier will be used to select the appropriate set of weightings for both identification of characters, and for subsequent weighting modification.

This in turn allows a single central processing system 10 to be used to identify handwriting from a number of users. This can be used, for example in a network based environment, such as the Internet, to allow a single processing system to analyse handwriting submitted from different users via a web-site or the like.

The invention may also be said broadly to consist in the parts, elements and features referred to or indicated in the specification of the application, individually or collectively, in any or all combinations of two or more of said parts, elements or features, and where specific integers are mentioned herein which have known equivalents in the art to which the invention relates, such known equivalents are deemed to be incorporated herein as if individually set forth.

Although the preferred embodiment has been described in detail, it should be understood that various changes, substitutions, and alterations can be made herein by one of ordinary skill in the art without departing from the scope of the present invention as hereinbefore described and as hereinafter claimed.

Thus for example, instead of modifying the weighting of allographs, the method can involve simply removing the allographs that are not used by the user. This may be on a single case analysis basis, so when a used allograph is determined all others are eliminated from the class. Alternatively, this could be combined with the weighting modification, such that if the weighting of an allograph is modified more than a predetermined amount, the allograph is removed from the classification scheme.

The invention claimed is:

1. A system for modifying a classification scheme for classifying hand-written characters, said system comprising:
a memory storing the classification scheme containing a plurality of user dependent weighted allographs, each allograph representing a respective style of a respective letter; and
a processor configured for:
receiving data representing at least one handwritten character;
selecting an allograph representing the handwritten character in accordance with a weighting associated with each allograph;
modifying one or more of the allographs in accordance with the selection by modifying the weighting of said one or more of the allographs; and
storing a modified classification scheme which includes the modified allographs.

2. The system of claim 1, wherein said processor is further configured for:
determining a selection value based on similarity of the received character and a respective prototype vector of the stored classification scheme; and
selecting a respective one of the prototype vectors of the stored classification scheme in accordance with the determined selection value,
wherein each prototype vector represents a variation in the respective allograph.

3. The system of claim 2, wherein the processor is further configured for:
determining a feature vector representing the character, the feature vector being formed from a number of values, each value quantifying a respective feature of the character; and determining a distance value representing the distance between the determined feature vector and the respective prototype vector.

4. The system of claim 2, wherein the selection value is determined in accordance with the determined distance value and the weighting associated with the respective allograph.

5. The system of claim 1, wherein the data representing the handwritten character comprises digital ink.

6. The system of claim 5, further comprising an optically imaging pen for generating the digital ink.

* * * * *